UNITED STATES PATENT OFFICE.

CHARLES F. NICHOLSON, OF ROCHESTER, NEW YORK.

WATER-COLOR.

SPECIFICATION forming part of Letters Patent No. 324,147, dated August 11, 1885.

Application filed May 17, 1884. (Specimens.)

*To all whom it may concern:*

Be it known that I, CHARLES F. NICHOLSON, of Rochester, Monroe county, and State of New York, have invented a new and Improved Solution for and Preparation of Moist Water-Color Paints; of which the following is a full, clear, and exact description.

Artists in water-colors have long felt the want of good colors in a moist form or state, ready for use, and that not only would keep moist without souring or molding, but would dry quickly without chipping and cracking, and which could be bought at a reasonable figure. This my invention supplies, and by it I am enabled to furnish, cheap water-colors in a moist form, of superior color and quality, suitable, not only for general use, but for fine work requiring shading and blending, for which none but the best colors are applicable.

Ordinarily, for particular work, only the best imported colors in cake form are used, which is a very inconvenient form, inasmuch as the cakes are often so hard they spoil the brushes and take much time to rub off, and if left soaking sour or mold, or if dried each time they are used crack and chip. Too much wetting and drying also destroys the brilliancy and freshness of the color, as likewise does the rubbing of the cakes.

These and other objections my invention obviates, and it mainly consists in a solution or vehicle for the colors, composed of glucose, gum-arabic, and sirup, with or without other ingredients, and in the preparation of the same, and of the colors and mixture of the two, substantially as hereinafter described.

I take, for instance, say two (2) parts, by measure, of glucose, one (1) part of gum-arabic, and one (1) part of sirup, (best "white drips" preferred,) although these proportions will be more or less varied according to the color to be mixed with the solution. The above proportions, however, will answer for most colors.

The gum I first dissolve in the least possible amount of warm water and keep the same heated in a vessel without cover for twenty-four hours, more or less. While thus hot I add the glucose, and after the whole has cooled add the sirup, stirring the mixture as desired. Where the colors to be mixed are earth ones—such as umber and sienna—a larger proportion of sirup may be used; leads—such as yellows—more gum; and lakes and madders more glucose.

The dry colors are first ground, dried, and thoroughly refined, and should be pounded, ground, and sifted, so as to reduce them to a powder as fine and soft as flour. They are then mixed with the solution to the consistence of a thick paste, earth-colors generally taking the most solution to mix them, leads less, and lakes least of all. From experiment I have found that one (1) pound of burnt sienna will take about eight (8) ounces of the solution, more or less. The moist colors thus prepared are then ground on a marble slab or other suitable surface by any proper machine—as for instance, by a machine similar to the machines used for grinding colors in oil and japan—and afterward ground again with a slab-knife, after which the moist colors are or may be put up in boxes ready for use. This preparation of water-colors in a moist state is altogether different from the mere use of gum or glue with the color, such as has before been used for coarse work—as, for instance, by toy-manufacturers and others.

Moist water-colors prepared as I have described will be superior both in color and quality to most of the better descriptions of colors in cake form for fine use, and much cheaper than the imported ones, and time by the artist will be largely economized by their use. They will not harden in the boxes in which they are put up, will preserve their brilliancy and freshness, will adhere firmly and dry perfectly though not too rapidly to interfere with the artist shading and blending by them, will neither sour nor mold, nor crack or chip, and a touch with water will bring up color directly, bright and fresh. When spread out on a plate or palette, they will harden or set when exposed, which will be found a great convenience in stencil shading; and after being wet they will almost immediately form another coat or crust over the top one, so smooth and glossy that dust can be easily taken off without its getting into the paint and injuring it.

Having thus described my invention, what I claim as new, and desire to secure by Letters Patent, is—

A semi-plastic water-color, consisting of a dry color in a finely-powdered condition, thoroughly mixed and incorporated with a solution composed of glucose, gum-arabic, and sirup, substantially as herein described.

CHARLES F. NICHOLSON.

Witnesses:
CHAS. S. COOK,
WILLIAM S. BEARD.